(12) United States Patent
Knight, Jr. et al.

(10) Patent No.: US 10,859,257 B2
(45) Date of Patent: Dec. 8, 2020

(54) ADVANCED FLASH EXHAUST HEAT RECOVERY

(71) Applicant: Bioleap, Inc., Tampa, FL (US)

(72) Inventors: James Knight, Jr., Tampa, FL (US); Olan Wayne Mitchell, Cape Coral, FL (US)

(73) Assignee: Bioleap, Inc., Tampa, FL (US)

( * ) Notice: Subject to any disclaimer, the term of this patent is extended or adjusted under 35 U.S.C. 154(b) by 152 days.

(21) Appl. No.: 16/296,577

(22) Filed: Mar. 8, 2019

(65) Prior Publication Data

US 2019/0203928 A1 Jul. 4, 2019

Related U.S. Application Data

(63) Continuation of application No. 15/782,220, filed on Oct. 12, 2017, now Pat. No. 10,267,511, which is a
(Continued)

(51) Int. Cl.
*F22B 3/00* (2006.01)
*F22B 1/14* (2006.01)
(Continued)

(52) U.S. Cl.
CPC ............. *F22B 3/00* (2013.01); *B01D 47/00* (2013.01); *B01D 53/265* (2013.01); *F22B 1/14* (2013.01);
(Continued)

(58) Field of Classification Search
CPC ...... F26B 2200/02; F26B 23/02; B01D 47/00; B01D 53/265; F22B 3/00; F22B 1/14; F22B 1/16; Y02B 30/52; Y02P 70/10
See application file for complete search history.

(56) References Cited

U.S. PATENT DOCUMENTS

| 3,131,035 A | 4/1964 | Erickson |
| 4,660,511 A | 4/1987 | Anderson |

(Continued)

FOREIGN PATENT DOCUMENTS

| CN | 1945181 A | 4/2007 |
| IN | 1772/MUM/2010 A | 6/2011 |

(Continued)

*Primary Examiner* — Jessica Yuen
(74) *Attorney, Agent, or Firm* — Wolter Van Dyke Davis, PLLC; David G. Maire

(57) ABSTRACT

Waste heat is extracted in two stages from the exhaust (20) of a biomass dryer (14) in a grain alcohol plant (10). A boiler circuit (56) provides a first steam at high pressure. A first energy recovery circuit (36) extracts heat from the exhaust via a non-contact heat exchanger (24) and provides a second, relatively lower pressure steam (78), thereby bypassing a portion of the boiler circuit. Working fluids in the boiler and first energy recovery circuits are maintained within boiler water quality specifications and are intermixed to allow the production of the second steam without a pressure reduction device. A second energy recovery circuit (44) extracts heat from the exhaust downstream of the first energy recovery circuit using a direct contact heat exchanger (38) and provides a non-boiler quality heated fluid (52), which may be a heated liquid or a third steam.

12 Claims, 3 Drawing Sheets

Related U.S. Application Data continuation-in-part of application No. 15/496,413, filed on Apr. 25, 2017, now Pat. No. 9,989,310.

(60) Provisional application No. 62/362,785, filed on Jul. 15, 2016.

(51) Int. Cl.
  *F22B 1/16* (2006.01)
  *B01D 47/00* (2006.01)
  *B01D 53/26* (2006.01)
  *F26B 23/02* (2006.01)

(52) U.S. Cl.
  CPC ............... *F22B 1/16* (2013.01); *F26B 23/02* (2013.01); *F26B 2200/02* (2013.01); *Y02B 30/52* (2013.01); *Y02P 70/10* (2015.11)

(56) References Cited

U.S. PATENT DOCUMENTS

| | | |
|---|---|---|
| 8,429,832 B2 | 4/2013 | Gissing et al. |
| 8,528,490 B1 | 9/2013 | Dueck et al. |
| 9,989,310 B2 * | 6/2018 | Knight, Jr. ............ F26B 25/005 |
| 10,267,511 B2 * | 4/2019 | Knight, Jr. ............ B01D 47/00 |
| 10,345,043 B2 * | 7/2019 | Knight, Jr. ............ B01D 53/265 |
| 2009/0031934 A1 | 2/2009 | Ganga et al. |
| 2009/0044737 A1 | 2/2009 | Ganga et al. |
| 2011/0108409 A1 | 5/2011 | Brown |
| 2011/0315541 A1 | 12/2011 | Xu |
| 2013/0309738 A1 | 11/2013 | Barr et al. |
| 2014/0311889 A1 | 10/2014 | Zaher et al. |

FOREIGN PATENT DOCUMENTS

| | | |
|---|---|---|
| WO | 2013144438 A1 | 10/2013 |
| WO | 2015/085012 A1 | 6/2015 |

\* cited by examiner

ADVANCED FLASH EXHAUST HEAT RECOVERY

This application is a continuation of U.S. patent application Ser. No. 15/782,220 filed 12 Oct. 2017, which in turn was a continuation-in-part of U.S. patent application Ser. No. 15/496,413 filed 25 Apr. 2017, which is incorporated by reference herein, and which in turn claimed benefit of the 15 Jul. 2016 filing date of U.S. provisional patent application No. 62/362,785.

FIELD OF THE INVENTION

This invention relates generally to recovering heat from waste gases produced during industrial processing of materials, and more specifically in one embodiment to recovering heat from the exhaust of a dryer used to remove moisture from a wet biomass produced during the production of alcohol.

BACKGROUND OF THE INVENTION

The efficient utilization of energy is important in any industrial process, and it is well known to recover heat from a process gas prior to exhausting the gas back into the environment. The production of an alcohol from corn or other biomass produces a moist solids byproduct (wet cake) which can be partially dried in a rotary drum or steam tube dryer before being further processed as animal feed or fertilizer. The dryer exhaust gas contains heat and moisture that can be captured before being released to the atmosphere.

U.S. Pat. No. 3,131,035 describes the recycling of dryer exhaust gas through an incinerator, with a portion of the incinerated gas being exhausted to atmosphere only after passing through a heat exchanger to pre-heat the bulk dryer exhaust gas travelling into the incinerator. That patent also teaches the extraction of heat from the exhaust gas via a heat exchanger using a liquid extracted from the material being dried. The heated liquid is then concentrated in an evaporator which produces both a concentrated liquid for reuse in the feedstock stream and a vapor that is condensed and disposed of in any suitable manner.

United States Patent Application Publication No. US 2011/0108409 A1 describes an ethanol production system where the exhaust stream from a steam dryer is directed to the bottom of a distillation column in order to heat the distillation column and to scrub the exhaust stream.

U.S. Pat. No. 8,429,832 describes the use of waste heat from a steam dryer being captured and used in the production of steam for the dryer.

International Application Publication No. WO 2013/144438 A1 describes the use of flue gas from a combustion device being used to heat a liquid to be concentrated in a multiple-effect evaporation plant.

Further improvements in the energy efficiency of such industrial processes are desired.

BRIEF SUMMARY OF THE INVENTION

The present inventors have recognized that the benefit of capturing waste heat from exhaust gas involves not only the way that heat is transferred from the exhaust gas into another fluid, but also the way that the heated fluid is subsequently used to extract the recovered heat energy. The inventors have also recognized that prior art energy recovery systems which utilize fluids that are produced from or that are in contact with a biomass have limited flexibility due to the chemicals included in such fluids. Moreover, simple recycling of a fluid to reuse heat energy is generally efficient, but it limits the use of the recycled energy to the heating of the fluid being recycled.

In contrast, the present invention provides both an efficient mechanism for capturing waste heat from a biomass dryer exhaust gas and a highly flexible mechanism for reusing the captured energy. This is accomplished in one embodiment by two-stage heat removal from the exhaust gas, wherein the first stage utilizes a non-contact heat exchanger, such as a condensing economizer, and the downstream second stage utilizes a direct contact heat exchanger, such as a plate or tube type heat exchanger.

Advantageously, a working fluid used in the non-contact heat exchanger is compatible with and can be intermixed with a fluid used in a balance of plant process. In a grain alcohol plant embodiment of the invention, one such working fluid is boiler feedwater quality water, which, after being heated by dryer exhaust gas, can be integrated into a boiler loop of a plant distillation process. Water is an ideal fluid for heat transfer due to its heat capacity and its low cost. The chemistry of boiler feedwater is typically closely controlled to minimize corrosion and to maintain heat transfer in the boiler loop. Boiler chemistry requirements exist to limit the inflow of harmful substances into the boiler and to maintain impurities in a form least likely to cause harm before they are removed from the boiler. For example, it is common to limit the amount of dissolved solids, to scavenge oxygen, and to maintain pH and alkaline conditions within predetermined limits. For a particular plant, boiler chemistry requirements are typically maintained in accordance with a specification, and the term "boiler quality" as used herein refers to the chemical composition required by specification for a particular plant's boiler loop. Advantageously, the working fluid utilized in the second stage of heat removal of the present invention need not be maintained with boiler-quality chemistry, since it is in direct physical contact with the exhaust gas.

The present inventors have also recognized an inherent inefficiency in the boiler/steam systems of existing grain alcohol plants. The inefficiency arises because those plants utilize steam at a number of different temperature/pressure conditions for a number of different purposes, including steam at a relatively high pressure for use in molecular sieves, steam at intermediate pressures for use in feedstock heaters and thin silage evaporators, and steam at relatively low pressure for use in the distillation columns. Because all of the plant steam is provided by a single boiler operating at the highest required pressure, steam for lower pressure uses is typically provided via an energy wasting pressure reduction device, such as a valve or orifice.

In contrast, an embodiment of the present invention minimizes such steam pressure reduction losses by extracting heat energy from the dryer exhaust gas stream using boiler feedwater quality water, and converting that heated water into steam at an intermediate pressure for use in the plant and subsequent return to the plant boiler circuit without the need for a pressure reduction device. As will be described more fully below, this approach effectively bypasses the boiler circuit for some of the plant steam uses. Moreover, non-boiler quality steam or heated water is provided for use in portions of the balance of the plant where boiler quality chemistry is not required, such as to heat a side stripper or beer column.

BRIEF DESCRIPTION OF THE DRAWINGS

The invention is explained in the following description in view of the drawings that show.

Similar components are numbered consistently among the several drawings.

DETAILED DESCRIPTION OF THE INVENTION

Figure 1:
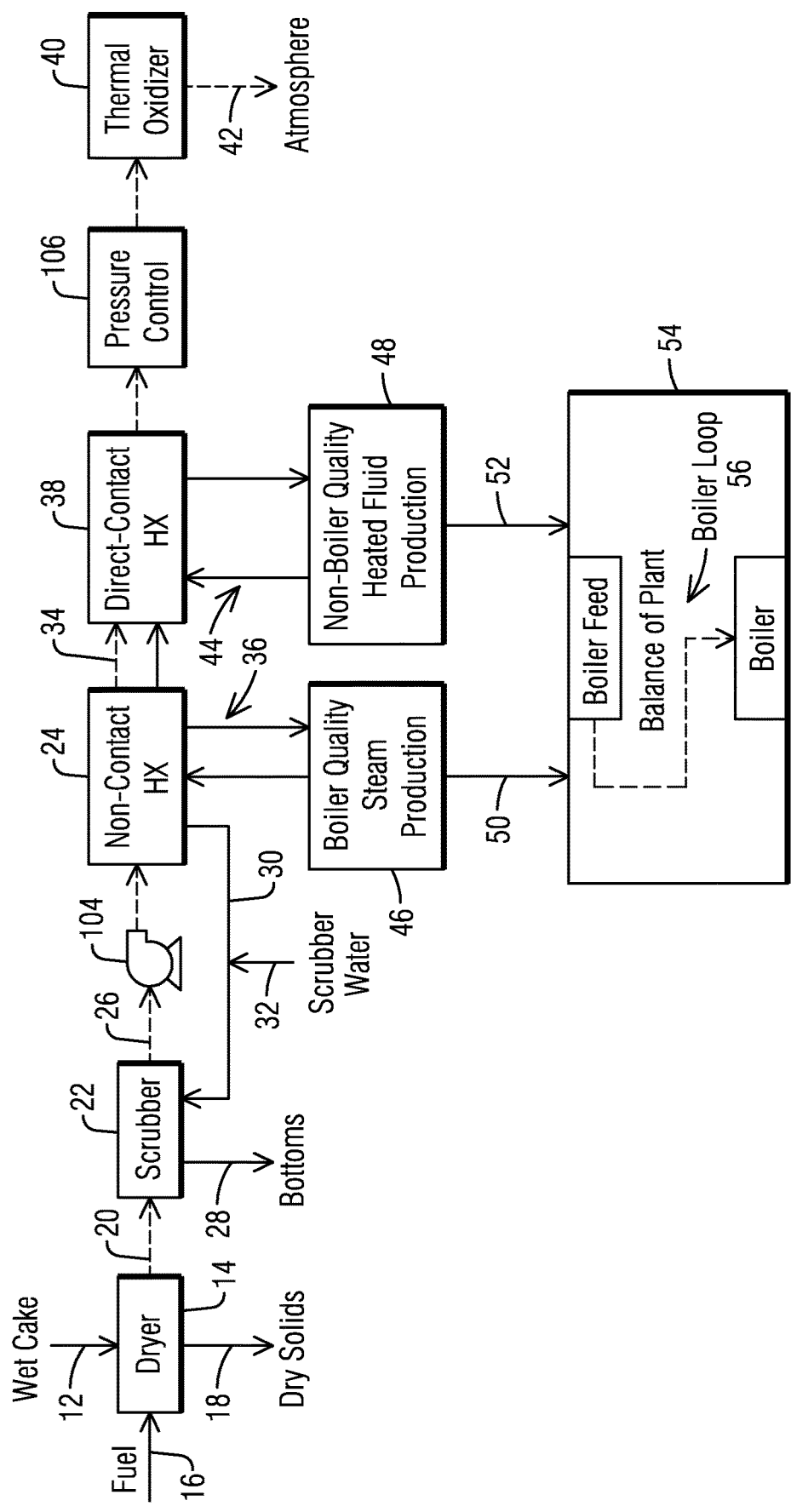
FIG. 1 is a schematic illustration of a grain alcohol plant incorporating aspects of the invention.

Reference is now made to FIG. 1 which is a block diagram of an embodiment of the invention as applied in a grain alcohol plant such as corn ethanol plant 10. A wet cake 12, such as corn or other biomass containing solids and water, is fed into an industrial dryer 14, such as a known rotary dryer or steam tube dryer. In the case of direct fire dryers, a fuel 16 such as natural gas is used as the energy source for drying the wet cake 12 to produce relatively drier solids 18. Dryer exhaust 20 evolved from the drying process may be directed through a saturation chamber or scrubber such as water scrubber 22 for two beneficial reasons. First, much of the particulate matter is removed from the dryer exhaust 20 which greatly reduces fouling and buildup of particulate matter on the heat transfer area of downstream heat exchangers. Second, by bringing dryer exhaust 20 into direct contact with a water source, the temperature of the dryer exhaust 20 drops and a proportional amount of water is evaporated. A dry scrubber may be used and will remove particulate matter, however, a wet scrubber, when optimized, will result in a fully saturated dryer exhaust 26, thereby optimizing heat transfer in a downstream non-contact heat exchanger (i.e. cooling fluid does not physically touch the exhaust gas) such as a dryer exhaust condensing economizer 24. The scrubber 22 may be of any known design, such as a spray tower, cyclone spray chamber, venturi scrubber, orifice scrubber, impingement scrubber, packed bed scrubber, etc. The saturated dryer exhaust 26 exits the water scrubber 22 and is directed into the dryer exhaust condensing economizer 24 where it functions as a heating agent for a working liquid to be described more fully below. Water scrubber bottoms 28, water plus particulate matter, is withdrawn from the water scrubber 22 at a rate as dictated by typical water scrubber design parameters. As the saturated dryer exhaust 26 passes through the dryer exhaust condensing economizer 24, a portion of the water vapor within the saturated dryer exhaust 26 will condense, producing dryer exhaust condensate 30. The dryer exhaust condensate 30 and/or supplemental scrubber water 32 may be provided as a water source for the scrubber 22. The somewhat dehydrated dryer exhaust 34 exits the dryer exhaust condensing economizer 24. The non-contact heat exchanger/condensing economizer 24 is part of a first energy recovery circuit 36, to be described more fully below.

The dryer exhaust 34 then flows downstream to a direct contact heat exchanger (i.e. cooling fluid makes physical contact with exhaust gas) such as a disentrainment vessel 38, which may include a mist eliminator, where additional water is condensed and heat energy is extracted, and then typically to a thermal oxidizer 40 before being passed to atmosphere 42. Additional known heat removal equipment/processes (not illustrated) may be used to capture additional heat energy from the exhaust of the thermal oxidizer 40 prior to release of the gas to the atmosphere 42. The direct contact heat exchanger 38 is part of a second energy recovery circuit 44, also described more fully below.

The present invention removes heat from the dryer exhaust gas flow at two locations disposed in series, utilizing one non-contact heat exchanger and one direct contact heat exchanger. Advantageously, this provides recovered heat energy at two different energy levels and with two different chemistries, thereby facilitating the utilization of the recovered energy in an efficient manner for different applications within the plant 10. In the embodiment of FIG. 1, the first energy recovery circuit 36 includes a boiler quality steam production element 46, and the second energy recovery circuit 44 includes a non-boiler quality heated fluid (steam or water) production element 48. The produced boiler quality steam 50 and non-boiler quality heated fluid 52 are delivered to respective portions of a balance of the plant 54 at respective temperatures and pressures permitting direct use without the need for further pressure or temperature modifications, with the boiler quality steam 50 having a chemistry allowing it to be integrated into a boiler loop 56 of the plant 10.

Figure 2:
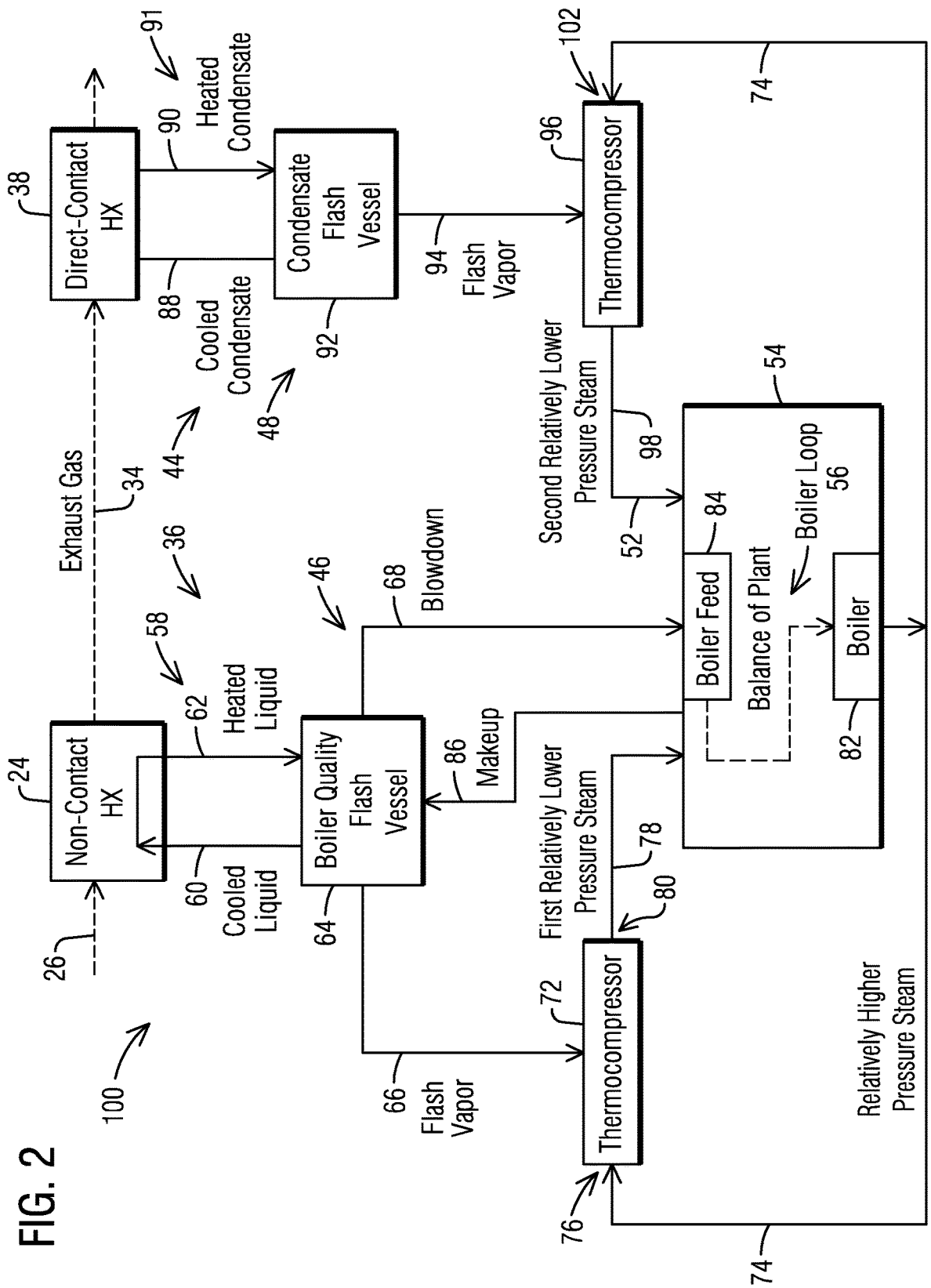
FIG. 2 is a schematic illustration of a grain alcohol plant illustrating an embodiment of the invention.

FIG. 2 illustrates an embodiment of the invention for a corn ethanol plant 100 where the non-boiler quality heated fluid 52 is steam. FIG. 2 illustrates additional details regarding the component parts and functionality of the boiler quality steam production element 46 and the non-boiler quality heated fluid production element 48 of FIG. 1.

First Energy Recovery Circuit

The non-contact heat exchanger 24 may be a plate-type, tube/shell or other design which allows for heat transfer from the exhaust gas 26 to a working liquid loop 58 without intermixing of the different fluids within the heat exchanger 24. The working liquid used in the non-contact heat exchanger 24 is a flash cooled liquid 60, which is directed into the non-contact heat exchanger 24 for indirect thermal communication with the saturated exhaust 26, such as in a counter flow direction or in a cross current direction as close to counter current as possible. The flash cooled liquid 60 obtains heat energy from the saturated dryer exhaust 26 and is withdrawn from the non-contact heat exchanger 24 as heated liquid 62. The heated liquid 62 is then directed to a flash vessel 64 where the heated liquid 62 undergoes flash cooling, producing the flash cooled liquid 60 and flash vapor 66. A portion of the circulating working liquid, preferably the flash cooled liquid 60, is withdrawn as blowdown 68 in order to control the buildup of solids in the system.

The flash vapor 66 is directed into the suction side 70 of a thermocompressor 72. Plant steam 74 is directed into the motive side 76 of the thermocompressor 72 in order to educe the flash vapor 66 into the suction side 70 of the thermocompressor 72. The resulting steam mixture 78 exits out of the discharge side 80 of the thermocompressor 72 at an intermediate pressure above that of the flash vapor 66 but below that of the plant steam 74. The steam mixture 78 can subsequently be used where there is demand 79 in the balance of the plant 54 for steam at the corresponding saturation temperature of the steam mixture 78, such as in a side stripper of the plant or to heat a beer column and/or a corn slurry in the plant.

The term "thermocompressor" as used herein is generally meant to include other similarly functioning devices such as injectors, ejectors, jet pumps, exhauster, etc. which merge lower and higher pressure fluids to produce an intermediate pressure fluid, such as by utilizing the venturi effect.

The plant steam 74 is provided by a boiler 82 which also provides plant steam 74 for other high pressure steam demands in the balance of plant 54, such as a molecular sieve (not shown). In this manner relatively low quality flash vapor 66 is converted to a higher intermediate quality mixture 78 in a very efficient manner, eliminating the need to reduce the pressure of available plant steam 74 with a less efficient pressure reducing valve in order to satisfy an intermediate pressure steam demand in the plant 100. Spent steam is condensed and provided as condensate to a boiler feed vessel 84. Makeup liquid 86 is added to the flash vessel 64 in order to make up for the loss of mass from the fluid loop 58 as flash vapor 66 and blowdown 68. Makeup liquid 86 may be introduced directly into the flash vessel 64, as illustrated, or at another location in the working liquid loop 58. Makeup liquid 86 may be sourced from condensate from the balance of plant 54 or from other convenient sources such as from the boiler feed vessel 84 or from a boiler makeup water source (not illustrated). In some embodiments, blowdown 68 from the flash vessel 64 may be circulated directly or indirectly back to the boiler feed vessel 84.

It may be appreciated from the figure that the boiler circuit or loop 56 of the plant 100 includes the boiler feed vessel 84, boiler 82, and other portions of the balance of plant 54 including a condenser (not illustrated). While the boiler 82 provides relatively higher pressure steam, the first energy recovery circuit 36 exists in parallel to the boiler circuit 56 and serves to provide a first relatively lower pressure steam 78 for intermediate or low pressure uses in the balance of the plant 54. The first energy recovery circuit 36 includes the working fluid loop 58 moving heat from the non-contact heat exchanger 24 into the flash vessel 64, as well as the thermocompressor 72, portions of the balance of the plant 54 and boiler feed vessel 84. Both circuits 36, 56 operate with intermixed and essentially identical fluids, which in this embodiment of the invention is boiler quality water.

One of the benefits of utilizing steam condensate, or similar water solutions, in the first energy recovery circuit 36 is the nearly identical composition of the flash vapor 66 to that of typical boiler derived plant steam. Utilizing a compatible liquid, such as plant steam condensate, yields identical or nearly identical condensate from the steam mixture 78 as compared to typical boiler derived plant steam condensate. This allows the first energy recovery circuit 36 of the present invention to be installed within the constructs of typical steam systems without the use of non-boiler compatible liquids. Other embodiments may be envisioned where the working fluid is a non-water fluid that is compatible with a non-water balance of plant system fluid, for example a closed Rankine cycle using an alternative fluid such as ethanol or methanol.

Second Energy Recovery Circuit

Downstream of the non-contact heat exchanger 24, the dryer exhaust gas 34 is directed into a direct contact heat exchanger 38 where additional heat energy and moisture is removed from the gas by direct exposure to a cooling fluid such as a cooled condensate 88. The heated condensate 90 which includes the condensed moisture removed from the direct contact heat exchanger 38 is directed in a condensate loop 91 to a condensate flash vessel 92 where it is cooled to produce the cooled condensate 88 and a flash vapor 94. Unlike the flash vapor 66 produced in the first energy recovery circuit 36, the flash vapor 94 produced in the second energy recovery circuit 44 would not meet boiler quality specifications because of chemicals entrained from the exhaust gas 34 in the direct contact heat exchanger 38. However, for the purposes of the present invention, the flash vapor 94 can advantageously be combined with relatively higher pressure steam 74 from the boiler circuit 56 in a thermocompressor 96 to produce a second relatively lower pressure steam 98. Thus, in this embodiment, the second energy recovery circuit 44 includes the direct contact heat exchanger 38, condensate flash vessel 92 and thermocompressor 96 operating to produce a non-boiler quality heated fluid 52 in the form of steam 98. The temperature/pressure of the second relatively lower pressure steam 98 may be selected/controlled to be higher or lower than that of the first relatively lower pressure steam 78 depending upon the need for such steam supplies in the balance of plant 54 so that the efficiency of the plant 100 may be optimized. The fluid provided to the motive side 102 of the thermocompressor 96 may be high pressure steam directed from the boiler 82 or from another source having a higher pressure than that of the flash vapor 94.

The present invention allows the recovered dryer exhaust heat energy to be utilized in an efficient manner. Moreover, condensation of water from within the dryer exhaust gas facilitates the removal of some water soluble pollutants that would otherwise either have to be destroyed, typically in the thermal oxidizer 40, or emitted as pollution to the atmosphere 42. The optional inclusion of the saturation step, i.e. water scrubber 22, is capable of removing even more potential pollutants than the condensation alone. Energy consumed in the thermal oxidizer 40 can be estimated as the net increase in temperature between the feed gases and the exit gases, multiplied by the specific heat of those gases, multiplied by the mass flow rate of those gases. The condensation of water from within the dryer exhaust by the present invention reduces the total mass flow of the dryer exhaust that enters the thermal oxidizer 40, which subsequently reduces the amount of energy used and wasted during the downstream oxidization step.

Heat transfer efficiency in the dryer exhaust condensing economizer 24 may be improved by increasing the pressure of the saturated exhaust 26 to a value above the normal ambient pressure used to induce the flow of the gas through the system. This may be accomplished by including a pressure increasing device such as a blower 104 (see FIG. 1) in the exhaust flow path anywhere upstream of the dryer exhaust condensing economizer 24 (e.g. upstream of the dryer 14, between dryer 14 and scrubber 22, or between scrubber 22 and non-contact heat exchanger 24) and a pressure control device 106 in the exhaust flow path anywhere downstream of the non-contact heat exchanger 24 and before venting to atmosphere 42. When upgrading an existing plant to include this optional feature, excess capacity of an existing blower of the dryer system may be utilized, subject to pressure limitations in the remainder of the system components. A pressure increase of only one inch of mercury may yield a twenty five percent improvement in the log mean temperature difference in the dryer exhaust condensing economizer 24.

Figure 3:
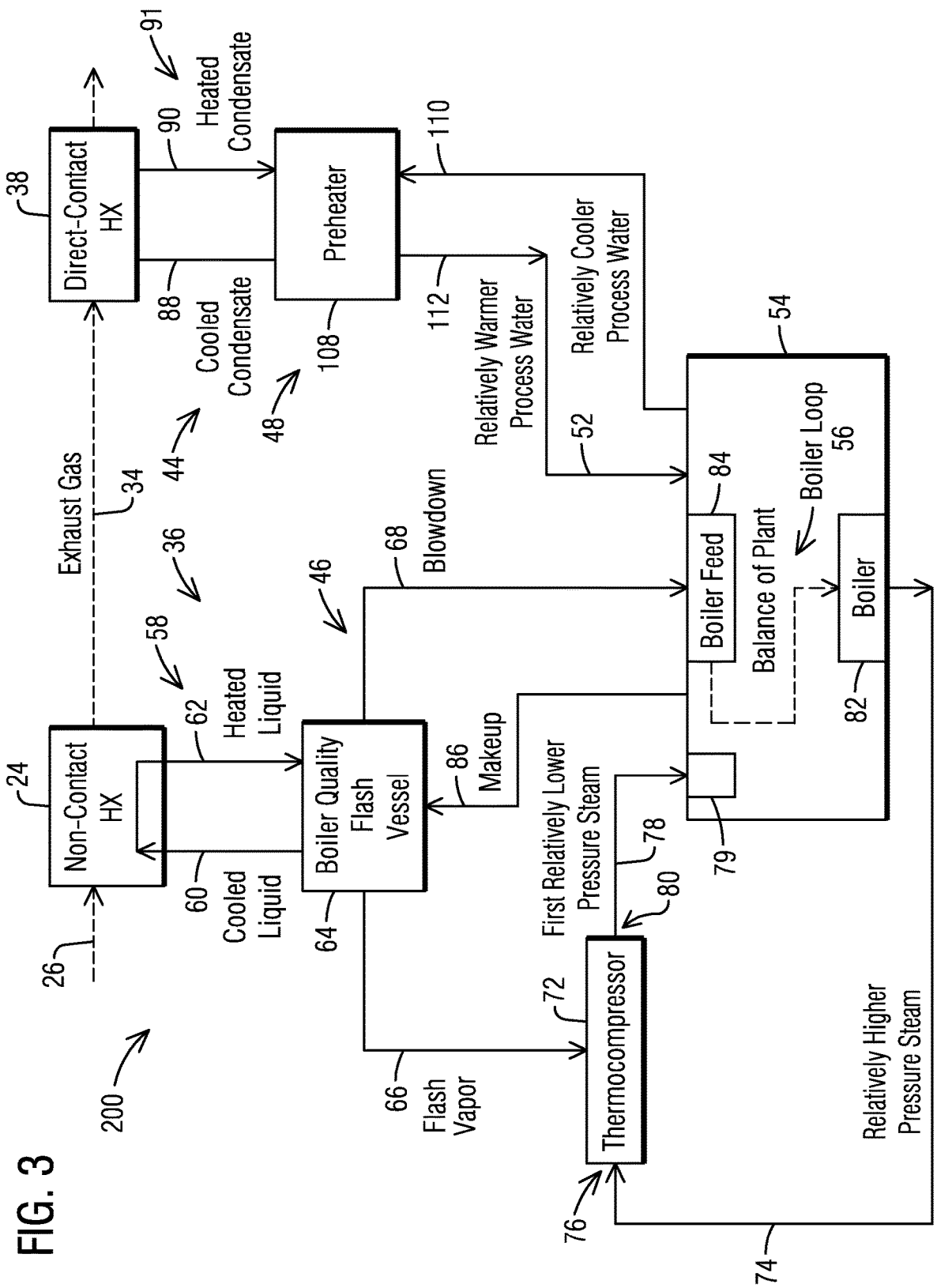
FIG. 3 is a schematic illustration of a grain alcohol plant illustrating another embodiment of the invention.

FIG. 3 illustrates an embodiment of the invention for a corn ethanol plant 200 where the non-boiler quality heated fluid 52 is heated water. Plant 200 includes a first energy recovery circuit 36 identical to that of plant 100 of FIG. 2 for providing a first relatively lower pressure (boiler quality) steam 78 using heat extracted in a non-contact heat exchanger 24. Also as in plant 200, a direct contact heat exchanger 38 is used to produce heated condensate 90 as part of a second energy recovery circuit 44. Unlike plant 200, the heat energy extracted in the second energy recovery circuit 44 is used to heat a plant process fluid in a heat exchanger such as preheater 108, where relatively cooler process water 110 is heated to produce relatively warmer (non-boiler quality) process water 112 for supply to satisfy an appropriate demand within the balance of the plant 54.

While various embodiments of the present invention have been shown and described herein, it will be obvious that such embodiments are provided by way of example only. Numerous variations, changes and substitutions may be made without departing from the invention herein. For example, the direct contact heat exchanger may be a single vessel or multiple vessels, may be in the form of a scrubber, or may be embodied as a downstream section of the non-contact heat exchanger. Other variations may include indirect interconnection of various components illustrated herein as being directly interconnected. Accordingly, it is intended that the invention be limited only by the spirit and scope of the appended claims.

The invention claimed is:

1. A method for recovering energy from an exhaust gas produced by a dryer in a grain alcohol plant, the method comprising the steps of:
   producing a first steam in a boiler circuit of the plant for a first use in the plant;
   extracting heat from the exhaust gas with a first energy recovery circuit comprising a non-contact heat exchanger;
   intermixing a portion of the first steam of the boiler circuit and a flash vapor from the first energy recovery circuit to produce a second steam for a second use in the plant, the second steam having a pressure lower than a pressure of the first steam; and
   utilizing a second energy recovery circuit comprising a direct contact heat exchanger disposed downstream of the non-contact heat exchanger in a flow path of the exhaust gas to provide a heated fluid for a third use in the plant.

2. The method of claim 1, further comprising:
   producing the flash vapor in a flash vessel receiving a heated working liquid from the non-contact heat exchanger; and
   intermixing the portion of the first steam and the flash vapor in a thermocompressor to produce the second steam.

3. The method of claim 2, further comprising providing makeup fluid to the flash vessel sourced from the boiler circuit.

4. The method of claim 2, directing blowdown from the flash vessel to a boiler feed vessel of the boiler circuit.

5. The method of claim 1, further comprising saturating the exhaust gas with water vapor in a wet scrubber disposed between the dryer and the non-contact heat exchanger.

6. The method of claim 5, further comprising delivering condensate from the non-contact heat exchanger to the wet scrubber.

7. The method of claim 1, further comprising controlling a pressure of the exhaust gas in the non-contact heat exchanger by cooperatively operating a pressure increasing device disposed in a flow path of the exhaust gas upstream of the non-contact heat exchanger and a pressure control device disposed in the flow path of the exhaust gas downstream of the non-contact heat exchanger.

8. The method of claim 1, wherein the flash vapor is a first flash vapor, and further comprising producing the heated fluid by:
   producing a second flash vapor in a flash vessel receiving heated condensate from the direct contact heat exchanger; and
   intermixing a portion of the first steam and the second flash vapor in a thermocompressor to produce the heated fluid as a third steam.

9. The method of claim 8, further comprising directing the second steam to a side stripper of the plant.

10. The method of claim 8, further comprising using the third steam to heat at least one of a beer column and a corn slurry in the plant.

11. The method of claim 1, further comprising producing the heated fluid as heated process water by heating process water from the plant in a preheater using heated condensate received from the direct contact heat exchanger.

12. The method of claim 1, wherein the grain alcohol plant is a corn ethanol plant.

* * * * *